United States Patent
Rubin et al.

[15] 3,677,069
[45] July 18, 1972

[54] PLANAR VISCOMETER

[72] Inventors: Jacob C. Rubin; Gerald J. Sukel, both of Rochester, N.Y.

[73] Assignee: Eastman Kodak Company, Rochester, N.Y.

[22] Filed: Aug. 6, 1970

[21] Appl. No.: 61,595

[52] U.S. Cl. ................................................73/56, 138/44
[51] Int. Cl. .......................................................G01n 11/06
[58] Field of Search..........................73/56, 54, 58, 59, 60, 55

[56] References Cited

UNITED STATES PATENTS

| | | | |
|---|---|---|---|
| 3,393,553 | 7/1968 | Kleinschmidt | 73/54 |
| 2,343,030 | 2/1944 | Simmons | 73/56 |
| 3,064,468 | 11/1962 | Muench et al. | 73/55 |

OTHER PUBLICATIONS

Hallikainen, K. E., Viscoity Measurement. In Instruments and Control Systems. Vol. 35: pg. 137–140. Feb. 1962.

*Primary Examiner*—Louis R. Prince
*Assistant Examiner*—Joseph W. Roskos
*Attorney*—Robert W. Hampton and Milton S. Sales

[57] ABSTRACT

For measuring the viscosity of a thin planar film of fluid which may be simple, may contain solid particles in suspension, may be a mixture of several fluids, or may be any combination of these; a planar viscometer including (1) a mixing tank, (2) a planar flow generator including in series a long straight cylinder, a long diffuser, a short converging nozzle and a planar transition section of constant section, and (3) means forming a laminar flow passage.

8 Claims, 3 Drawing Figures

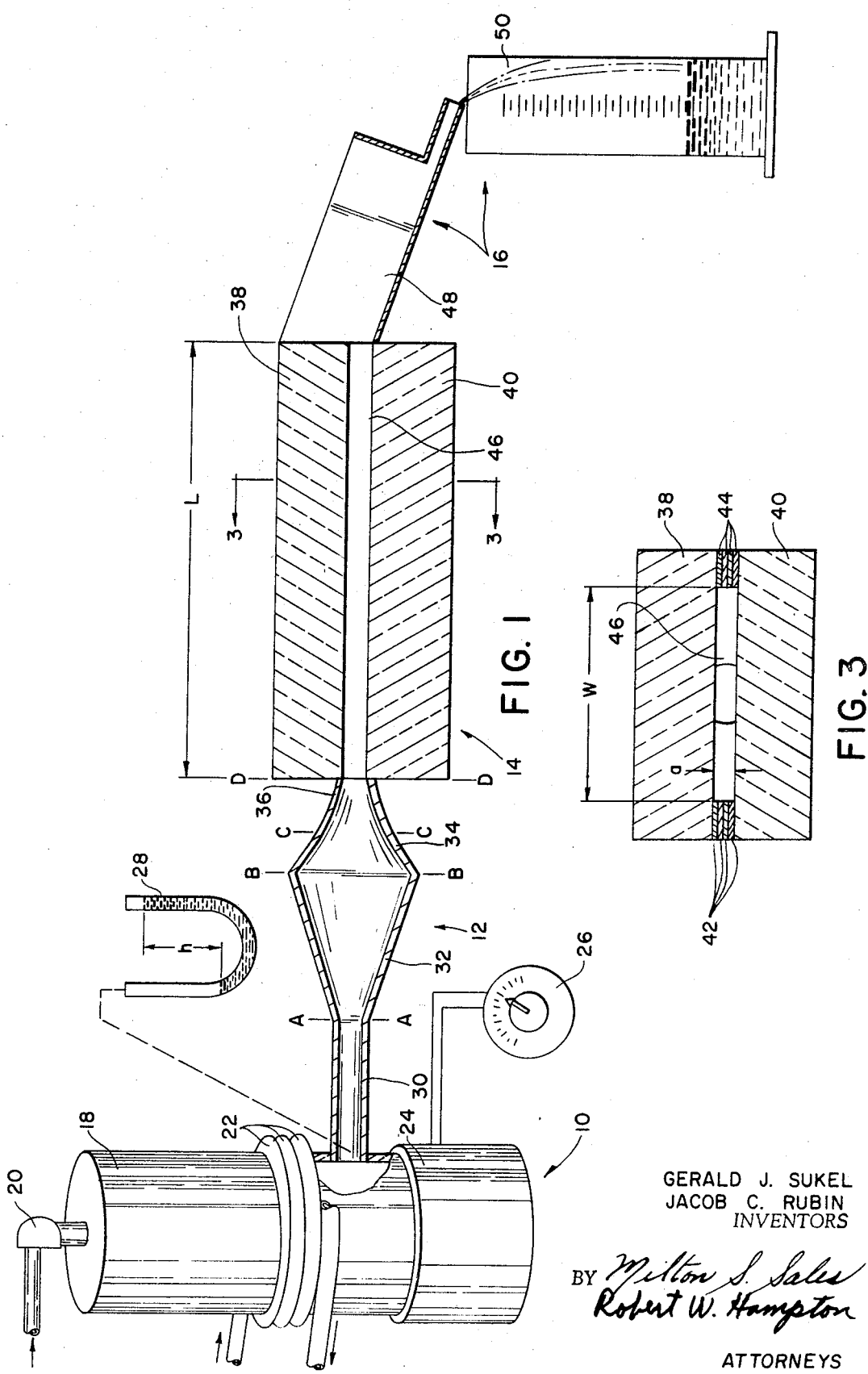

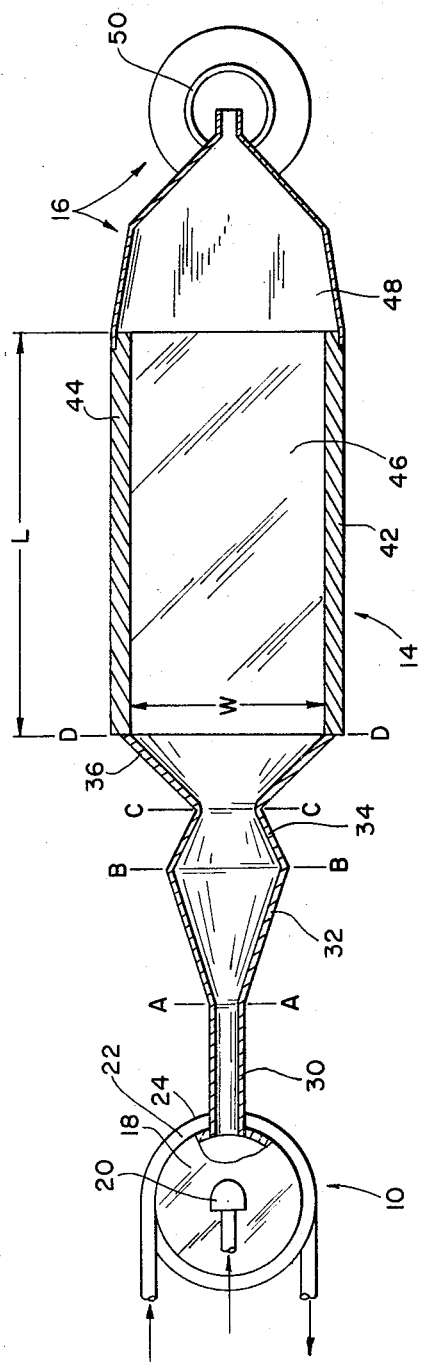

PLANAR VISCOMETER

BACKGROUND OF THE INVENTION

1. Field of the Invention

This invention relates to viscometers for measuring the viscosity of fluids, and more particularly to a viscometer for measuring the viscosity of a thin film of fluid flowing in a plane.

2. Description of the Prior Art

The viscosity of liquids and mixtures is an important parameter in controlling various manufacturing processes. Present day instrumentation involved with viscosity measurement is based largely upon telescopic or rotational flow, when as practical matter, many of the practical applications involve planar flow, that is, flow between two parallel surfaces very close together.

In telescopic and rotational flow type instruments, the velocity of a fluid layer varies considerably from lamina to lamina. In telescopic flow, the velocity is greatest at the center while in rotational flow it is greatest at the outer cylinder. In either case, it is evident that a fluid whose viscosity is velocity-dependent (a non-Newtonian fluid whose viscosity is said to be anomalous) cannot be readily measured.

While it is known and appreciated that under practical conditions the viscosity of many fluids is anomalous, nevertheless, most measurements are still being made under cylindrical geometrical flow conditions, it being assumed that the viscosity is constant (within engineering error) under the conditions being investigated.

SUMMARY OF THE INVENTION

It is an object of the present invention to provide a planar viscometer which will measure fluids of simple or complex composition under true planar flow conditions.

In accordance with the above object, a viscometer for measuring the coefficient of viscosity of a thin film of fluid flowing in a plane includes a planar flow generator having an inlet for receiving a fluid, an outlet, and means for delivering the received fluid to the outlet in a thin film planar flow. The outlet is connected to a laminar flow passage having means for determing the flow rate of the fluid therethrough.

The planar flow generator of the present invention may include a long, straight cylinder for producing irrotational flow without secondary interference. A long diffuser is arranged to receive fluid from the cylinder for creating a fluid reservoir by gradual velocity-to-pressure recovery. Fluid from the diffuser is received by a short converging nozzle for creating secondary flow in the diffuser, the fluid then passing into a planar transistor having an inlet with a circular cross section and an outlet with a rectangular cross section.

The invention, and its objects and advantages, will become more apparent in the detailed description of the preferred embodiment presented below.

BRIEF DESCRIPTION OF THE DRAWINGS

The above and other objects and advantages of the present invention will become apparent to one skilled in the art from the following detailed description read in conjunction with the attached drawings wherein like reference numerals indicate like elements and wherein:

FIG. 1 is a schematic, front elevational view showing a planar viscometer in accordance with the present invention;

FIG. 2 is a schematic, plan view of the planar viscometer shown in FIG. 1; and

FIG. 3 is a cross-sectional view taken along the line 3—3 of FIG. 1.

DESCRIPTION OF THE PREFERRED EMBODIMENT

The coefficient of viscosity parameter $\mu$ is defined as the shear stress divided by the shear strain rate, or:

$$\mu = \frac{\text{shear stress}}{\text{shear strain rate}} \quad (1)$$

It will be shown that for uniform flow between parallel planes, the coefficient of viscosity reduces to:

(2) $\mu = Wa^3 dp/12LdQ$; where
 $W$ = the plate width,
 $a$ = the spacing between the plates,
 $L$ = the length of a plate,
 $p$ = the pressure drop,
 $Q$ = the volumetric flow, and
 $dp/dQ$ = the rate of change of pressure drop with volumetric flow.

Where $dp/dQ$ is constant, the flow is Newtonian, i.e., the viscosity is not velocity-dependent. Where $dp/dQ$ is variable, the flow is non-Newtonian and the coefficient of viscosity is said to be anomalous.

Mathematical Model

Laminar flow is characterized by the motion of fluid particles along smooth paths in layers called laminas. Each layer glides smoothly over its adjacent layer. Such flow is governed by Newton's law of viscosity, which relates shear stress to rate of angular shear strain, using a coefficient known as viscosity.

The mathematical model for laminar flow between two stationary parallel plates is developed here using an arbitrary velocity for one of the plates, and then allowing that velocity to become zero. Consider flow between two parallel plates of width $w$ and length $l$ spaced $a$ apart, where $a \ll w$.

Consider an element of fluid located $y$ units from the stationary plate, and of thickness $dy$. Assume a shear stress $\tau$ at $y$ and a pressure $p$ existing at the left edge of the element. Then the shear at $(y + dy)$ is given by:

$$\tau + (d\tau)/(dy) \, dy,$$

and the pressure at the right edge of the element is given by $$p + dp/dl \, dl$$

Multiplying the respective shears and pressures by the appropriate areas; ($wdy$) for pressures and ($wdl$) for shears, we obtain the free-body force equations:

$$p \, (wdy) - \left( p + \frac{dp}{dl} \, dl \right) wdy - \tau \, (wdl) + \left( \tau + \frac{d\tau}{dy} \, dy \right)(wdl) = 0$$

Dividing through by the volume of the element ($wdldy$), we obtain:

$$\frac{p}{dl} - \left( p + \frac{dp}{dl} \, dl \right)\frac{1}{dl} - \frac{\tau}{dy} + \left( \tau + \frac{d\tau}{dy} \, dy \right)\frac{1}{dy} = 0$$

Clearing parentheses:

$$\left( \frac{p}{dl} - \frac{p}{dl} \right) - \frac{dp}{dl} + \left( \frac{\tau}{dy} - \frac{\tau}{dy} \right) + \frac{d\tau}{dy} = 0$$

or simply $$\frac{d\tau}{dy} \quad \frac{dp}{dl}$$

Since $dp/dl$ is clearly not a function of $y$, the differential equation may be solved by integration.

$$\tau = \int \frac{d\tau}{dy} \, dy = \int \frac{dp}{dl} \, dy = \frac{dp}{dl} \int dy = y \frac{dp}{dl} + A$$

or $$\tau = y \frac{dp}{dl} + A;$$

where $A$ is an integration constant.
By Newton's law of viscosity:

$$\tau = \mu \frac{du}{dy};$$

where

τ is the shearing stress
u is the velocity of the element y units from stationary plate
u is the viscosity $$\frac{du}{dy} = \frac{1}{\mu}\tau = \frac{1}{\mu}\left(y\frac{dp}{dl} + A\right) = \frac{ydp}{dl} + \frac{A}{\mu}$$

Again integrating with respect to y:

$$u = \int \frac{du}{dy} dy = \frac{dp}{dl}\int y\,dy + \frac{A}{\mu}\int dy$$

$$u = \frac{y^2 dp}{2\mu dl} + \frac{Ay}{\mu} + B;$$

Where B is a second integration constant.
Using the boundary conditions
$\mu = $ when $y = a$
$\mu = 0$ when $y = 0$ we obtain $B = 0$
and $$U = \frac{a^2 dp}{2\mu dl} + \frac{Aa}{\mu}; \quad \text{or } A = \frac{\mu}{a}\left(U - \frac{a^2 dp}{2\mu dl}\right)$$

The flowrate is obtained by integration.

$$Q = \int_0^a wu\,dy = \frac{wU}{a}\int_0^a y\,dy - \frac{wdp}{2\mu dl}\int_0^a (ay - y^2)\,dy$$

but $$\int_a^a y\,dy = \left[\frac{y^2}{2}\right]_a = \frac{a^2}{2}$$

and $$\frac{wU}{a}\left(\frac{a^2}{2}\right) - \frac{wdp}{2\mu dl}\left(\frac{a^3}{6}\right) = \frac{waU}{2} - \frac{wa^3 dp}{12\mu dl}$$

for no velocity of a moving plate, $$U = 0; Q = \frac{-wa^3 dp}{12 dl}$$

Neglecting the minus sign, which simply indicates flow in the direction of decreasing pressure, we may solve for μ:

$$\mu = wa^3 dp/12 dl Q$$

In the viscometer design of the present invention, planar laminar flow is established, and w, a, and dl are constants for any single measurement, then
$\mu = K(dp)/Q$
where dp is the pressure drop along the viscometer
Q is the flow through the viscometer
K is the viscometer constant K may be estimated as $wa^3/12dl$ using nominal dimensions of the parallel plates, or may be obtained via the calibration route, using a fluid of known viscosity. The latter technique is preferable because it balances out the effect of viscometer expansion, due to hydrostatic and thermal effects. A set of two parallel planes for measuring the viscosity of a liquid film offers several advantages. First, the geometry of the viscometer corresponds closely to the way films are used in many practical cases. Secondly, the measuring apparatus is simple, involving no moving parts; pressure differential may be obtained by gravity flow if desired; otherwise by pump. Thirdly, and probably of greatest importance, disturbance to the fluid is minimized, avoiding side effects such as spin-out of slurry or clotting and homolysis of blood, etc.

It is evident from the above discussion that a planar viscometer would be the more reliable measuring technique if the viscosity is expected to vary with velocity, or if the fluid is used in a thin film. Where both these conditions prevail, planar viscometry would appear as overwhelming choice.

Preferred Embodiment

Referring to the drawings, the illustrated embodiment of the present invention comprises a supply source 10 of fluids of variable compositions to be investigated, a planar flow generator means 12, a laminar flow passage means 14, and a measuring means 16.

Supply source 10 includes a mixing chamber 18, which may conveniently be of glass composition, having an inlet 20 for receiving the fluid to be investigated under pressure. The fluid in mixing chamber 18 is kept at a constant temperature by means of heating coils 22 (only a few turns of which are shown in the interests of clarity) through which hot water is circulated by means not shown in the drawing. The contents of chamber 18 are agitated to insure a homogeneous composition by for instance rotation of a bar magnet (not shown) within mixing chamber 18 by a magnetic mixer 24. The rate of agitation is controlled by means of a rheostat 26.

The contents of the mixing chamber 18 are delivered to the inlet of planar flow generator means 12 at a pressure determined by any convenient means. In the embodiment here illustrated, the pressure at the inlet to the planar flow generator 12 is connected to one end of an open tube manometer 28; the open end of the manometer being vented to atmosphere for reasons which will become apparent.

Planar flow generator means 12 includes three sections 30, 32 and 34 connected in cascade and having circular cross sections. First section 30 has the geometrical configuration of a long cylinder and is adapted to remove rotational effects of mixing chamber 18. The second section 32 is functionally a long diffuser for converting a large portion of velocity energy to pressure energy. Section 32 has the configuration of a truncated cone with the larger diameter or base being connected to the third section 34. Section 32 is made as long as possible to reduce losses as the fluid velocity is decreased. Third section 34 serves hydrodynamically as a short converging nozzle having the configuration of a truncated cone for creating radially-symmetric three-dimensional flow. The base of section 34 has a diameter complementary to that of outlet of the second section 32 and the other end is applied to a constant area transition stage 36. The inlet end of stage 36 has a generally circular cross-sectional shape corresponding to the generally circular output end of section 34 and the outlet end of stage 36 has a rectangular shape. The remaining portion has a cross-sectional configuration which forms a smooth transition from the circular shape of the inlet to the rectangular shape of the outlet. Fluid flow from section 36 is characterized by a significant proportion of secondary flow; that is, flow having a vector velocity component at right angles to the through-flow direction. Leaving section 36, the fluid is confined between two rigid planar-flow plates 38 and 40 of laminar flow passage means 14. Plates 38 and 40 are selected thick enough so as to avoid excessive pressure deformation; they are securely clamped, with the plate edges sealed and separated by full length precision shims 42 and 44 to provide a laminar flow passage 46. The mathematical quantities W, a and L in equation (2) are physically identified in FIGS. 1, 2 and 3. The spacing a in a practical embodiment may be in the order of one mil to ten mils depending upon the anticipated viscosity range.

Measuring means 16 for illustrative purposes comprises a discharge collector 48 and a cylindrical graduate 50. As appreciated best in the view of FIG. 1, discharge collector 48 is aligned with laminar flow passage 46. The volumetric flow rate a is determined by comparing the volume of fluid collected in cylinder 50 during a given time period.

OPERATION OF THE DEVICE

The dimensions a, W and L are part of the geometry selected for the planar viscometer as explained hereinbefore. Hence, for any given device they are constant. Equation (2) may therefore be written as:
(3) $\mu = K(dp)/Q$ Where $K = Wa^3/12L$ As may be seen from the parallel plate viscosity formula equation (2), supra, the plate spacing a is critical since it is a dimension which is cubed. Therefore, before using the viscometer, a substance of known viscosity, such as distilled water, is first passed through the viscometer and all the required measurements made. Equation (2) is then solved for $a$ and a check is then made between the magnitude as empirically determined and the magnitude of a in accordance with the design. The two should be fairly close, but in any event the empirical determined value for $a$ should be used. The value of the constant $K$ can then be determined. In a commercial embodiment, this would be done by the manufacturer. However, where the spacing $a$ is continuously changed (such as may be required in laboratory practice), calibration should always be accomplished first, using a Newtonian fluid of known coefficient of viscosity.

After calibration, the planar viscometer is ready for use. The fluid to be measured enters mixing chamber 18 through inlet 20, where it is then mixed thoroughly by means of magnetic mixer 24 to insure homogeneity. Heater coils 22 insure a constant temperature mixture.

The pressure at the inlet to planar flow generator means 12 is applied to one end of manometer 28. Since the fluid discharges from laminar flow passage means 14 at atmospheric pressure, the open tube end of manometer 28 is vented to atmosphere. The difference height $h$ (FIG. 1) in manometer 28 thus represents the difference between the entering pressure and the exit pressure. This pressure differential is $p$ in equation (3) First section 30 essentially eliminates any variation in cylindrical flow, that is, the flow at section A—A (FIG. 1) is irrotational and without secondary flow interference. The flow then passes through second section 32 or the long diffuser which reduces the velocity by a known ratio depending upon the relationship of the diameters at A—A and B—B. A reservoir is created at section B—B by gradual velocity-to-pressure recovery. Stated differently, the conical divergent nozzle 32 substantially reduces the velocity pattern (the velocity approaches but cannot reach zero magnitude).

Next, the fluid is passed to third section or short convergent nozzle 34 which gives the fluid radial components of velocity introducing the basis for secondary flow. Secondary flows of two dimensions are thus initiated at section C—C.

Next, the flow is passed to fourth section or the planar transition unit 36, in which secondary flow plays a major role resulting in a planar front wave which appears at the entrance D—D to laminar flow passage means 14.

At the measuring means 16, the flow rate is measured with the cylindrical graduate 50. The value of $Q$ is then calculated by dividing the volume of fluid collected by the lapsed time. Substituting $p$ and $Q$ in equation (3), the coefficient of viscosity $\mu$ can then be calculated.

The planar viscometer operates satisfactorily within a very wide range, being capable of measuring fluids from very slow velocity to rather high velocities. However, at the higher velocities the planar front at the entrance D—D to the laminar flow passage means 14 becomes more in a cylindrical wave form, and the viscosity measurement cannot then be determined under truly planar flow conditions. It is an engineering determination to know when and under what empirical conditions the viscosity measurements are valid, as obviously some deviation from the continuity of the planar condition of the wave front can be tolerated.

The invention has been described in detail with particular reference to a preferred embodiment thereof, but it will be understood that variations and modifications can be effected within the spirit and scope of the invention.

We claim:

1. A viscometer for measuring the coefficient of viscosity of a thin film of fluid flowing along a planar path, the coefficient of viscosity being a function of the difference in magnitude between pressures over the flow path and of the volumetric flow rate, said viscometer comprising:
   a planar flow generator including an inlet for receiving fluid, an outlet, and means for delivering said received fluid to said outlet in a thin film planar flow;
   a source for delivering said fluid to said generator inlet at a predetermined pressure and temperature;
   a laminar flow passage having an inlet connected to said generator outlet and having an outlet connected to a second predetermined pressure source; and
   means for measuring the volumetric flow rate of said fluid from said passage outlet.

2. A planar viscometer as defined in claim 1 wherein said planar flow generator comprises:
   a first section defining said first inlet and having a geometric configuration adapted to create a flow pattern of received fluid which is irrotational and substantially without secondary flow interference;
   a second section connected to receive fluid from said first section, said second section having a geometrical configuration adapted to create a fluid reservoir by gradual velocity-to-pressure recovery;
   a third section connected to receive fluid from said reservoir, said third section having a geometrical configuration for developing secondary flows in two dimensions in said fluid; and
   a fourth section defining said first outlet and connected to receive fluid from said third section, said fourth section having a geometrical configuration adapted to develop only one dimensional secondary flow in said fluid for delivery to said first outlet.

3. A viscometer as defined in claim 2 wherein the geometrical configuration of said first section is cylindrical.

4. A viscometer as defined in claim 2 wherein the geometrical configuration of said second section is that of a truncated cone having its larger diameter connected to said third section.

5. A viscometer as defined in claim 2 wherein the geometrical configuration of said third section is that of a short truncated cone having the shorter diameter thereof connected to said fourth section.

6. A viscometer as defined in claim 2 wherein said fourth section has an inlet of generally circular cross section, an outlet of generally rectangular cross section, and walls connecting the inlet and outlet of said fourth section such that the cross-sectional area along said fourth section is constant, whereby fluid exits from said first outlet with only one dimension of secondary flow.

7. A method of measuring the coefficient of viscosity of a thin film of fluid flowing along a planar path, said method comprising the steps of:
   creating an irrotational flow pattern in a fluid at a first position, said flow pattern being substantially without secondary flow interference;
   creating a fluid reservoir at a second position from fluid received from said first position, said reservoir being created by gradual velocity-to-pressure recovery;
   developing secondary flows in two dimensions at a third position in fluid received from said second position;
   creating flow at a fourth position from fluid received from said third position, said flow at said fourth position having only one dimensional secondary flow;
   delivering fluid from said fourth position to a planar flow passage;
   measuring the pressure drop of the fluid along said planar flow passage; and
   measuring the volumetric fluid flow rate through said flow passage.

8. A method as defined in claim 7 further comprising the step of calculating a value for the coefficient of viscosity using the formula $$\mu = \frac{wa^3}{12L} \frac{dp}{dQ}, \text{ where:}$$

$\mu$ = the coefficient of viscosity,
$w$ = the width of said flow passage,
$a$ = the height of said flow passage,
$L$ = the length of said flow passage,
$p$ = the pressure drop, and
$Q$ = the volumetric fluid flow rate.

* * * * *